US011620254B2

(12) United States Patent
Miller et al.

(10) Patent No.: US 11,620,254 B2
(45) Date of Patent: Apr. 4, 2023

(54) REMOTE DIRECT MEMORY ACCESS FOR CONTAINER-ENABLED NETWORKS

(71) Applicant: International Business Machines Corporation, Armonk, NY (US)

(72) Inventors: Scott Miller, Poughkeepsie, NY (US); Austen William Lauria, Dutchess, NY (US); Sameh Sherif Sharkawi, Cypress, TX (US); William P. LePera, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 114 days.

(21) Appl. No.: 16/891,721

(22) Filed: Jun. 3, 2020

(65) Prior Publication Data
US 2021/0382846 A1 Dec. 9, 2021

(51) Int. Cl.
*G06F 3/06* (2006.01)
*G06F 15/173* (2006.01)
*G06F 9/52* (2006.01)
*G06F 9/455* (2018.01)

(52) U.S. Cl.
CPC .... *G06F 15/17331* (2013.01); *G06F 9/45558* (2013.01); *G06F 9/52* (2013.01)

(58) Field of Classification Search
CPC ................ G06F 15/17331; G06F 9/45558; G06F 9/52
See application file for complete search history.

(56) References Cited

U.S. PATENT DOCUMENTS

| | | | | |
|---|---|---|---|---|
| 7,730,258 B1 * | 6/2010 | Smith | ................ | G06F 12/0806 711/114 |
| 8,489,811 B1 * | 7/2013 | Corbett | ................ | G06F 16/188 707/827 |
| 8,868,530 B1 * | 10/2014 | Thoppal | .............. | G06F 11/2097 707/704 |

(Continued)

FOREIGN PATENT DOCUMENTS

WO 2016195624 A1 12/2016

OTHER PUBLICATIONS

Brogi et al., "DockerFinder: Multi-Attribute Search of Docker Images," 2017, IEEE International Conference on Cloud Engineering (IC2E), IEEE, 2017, 6 pages.

*Primary Examiner* — Vivek Srivastava
*Assistant Examiner* — Wuji Chen
(74) *Attorney, Agent, or Firm* — Garg Law Firm, PLLC; Rakesh Garg; Nathan Rau

(57) ABSTRACT

An embodiment includes mapping, responsive to receiving a request for a container image from a container host, the requested container image to a first computer memory on a registry server. The embodiment also includes exposing a window storing the mapped container image to the container host using a collective window-creation call with the container host. The embodiment also includes processing a Remote Direct Memory Access (RDMA) data transfer request to select a lock type for the window during the RDMA data transfer. The embodiment also includes imposing the selected lock type on the window during the RDMA data transfer. The embodiment also includes releasing the selected lock type from the window upon detecting completion of the RDMA data transfer.

25 Claims, 9 Drawing Sheets

(56) References Cited

U.S. PATENT DOCUMENTS

| | | | |
|---|---|---|---|
| 9,026,495 B1* | 5/2015 | Lent | G06F 12/12 |
| | | | 707/649 |
| 9,075,638 B2 | 7/2015 | Barnett et al. | |
| 9,086,892 B2 | 7/2015 | Fontignie et al. | |
| 9,104,501 B2 | 8/2015 | Jea et al. | |
| 9,164,702 B1* | 10/2015 | Nesbit | G06F 3/061 |
| 9,215,279 B1* | 12/2015 | Le | H04L 67/1097 |
| 9,544,243 B2* | 1/2017 | Lentini | H04L 47/70 |
| 9,648,102 B1* | 5/2017 | Davis | H04L 67/56 |
| 10,095,532 B2* | 10/2018 | Hiltgen | G06F 9/45545 |
| 10,261,782 B2 | 4/2019 | Suarez et al. | |
| 10,289,555 B1* | 5/2019 | Michaud | G06F 12/109 |
| 10,291,706 B1 | 5/2019 | Zhao et al. | |
| 10,360,187 B1* | 7/2019 | Emelyanov | G06F 3/0623 |
| 10,977,134 B2* | 4/2021 | Shetty | G06F 11/1469 |
| 2006/0067346 A1* | 3/2006 | Tucker | G06F 12/1081 |
| | | | 711/E12.067 |
| 2008/0127203 A1* | 5/2008 | Huang | H04L 67/10 |
| | | | 719/313 |
| 2012/0265837 A1* | 10/2012 | Grant | H04L 67/025 |
| | | | 709/212 |
| 2014/0237156 A1* | 8/2014 | Regula | G06F 13/4027 |
| | | | 710/314 |
| 2014/0359044 A1* | 12/2014 | Davis | H04L 45/74591 |
| | | | 709/213 |
| 2015/0006478 A1* | 1/2015 | Raymond | G06F 16/27 |
| | | | 707/696 |
| 2015/0278242 A1* | 10/2015 | Grosman | G06F 16/2343 |
| | | | 707/704 |
| 2016/0103901 A1* | 4/2016 | Kadav | G06F 9/46 |
| | | | 707/614 |
| 2016/0239437 A1* | 8/2016 | Le | H04L 67/10 |
| 2017/0300394 A1* | 10/2017 | Raut | G06F 11/203 |
| 2017/0344289 A1* | 11/2017 | Jeong | G06F 16/188 |
| 2018/0074983 A1* | 3/2018 | Kawashima | G06F 12/1081 |
| 2018/0115585 A1* | 4/2018 | Rubakha | G06F 21/53 |
| 2019/0068501 A1* | 2/2019 | Schneider | G06F 9/4881 |
| 2019/0141128 A1* | 5/2019 | Hallak | H04L 67/1097 |
| 2019/0188181 A1 | 6/2019 | Degani et al. | |
| 2019/0354378 A1 | 11/2019 | Battaiola Kreling et al. | |
| 2020/0042475 A1* | 2/2020 | Venkataramani | G06F 13/28 |
| 2020/0177451 A1* | 6/2020 | Easterling | G06F 9/45558 |
| 2021/0042098 A1* | 2/2021 | Madisetti | G06F 8/4441 |
| 2021/0117249 A1* | 4/2021 | Doshi | H04L 67/1001 |
| 2021/0203554 A1* | 7/2021 | Peng | H04L 41/0826 |
| 2021/0303523 A1* | 9/2021 | Periyagaram | G06F 16/13 |
| 2022/0027051 A1* | 1/2022 | Kant | G06F 3/0605 |

\* cited by examiner

(12) United States Patent
US 11,620,254 B2

REMOTE DIRECT MEMORY ACCESS FOR CONTAINER-ENABLED NETWORKS

BACKGROUND

The present invention relates generally to a method, system, and computer program product for network management. More particularly, the present invention relates to a method, system, and computer program product for Remote Direct Memory Access (RDMA) for container-enabled networks.

A containerized application is a computer software application that includes other software components needed to run the application. For example, containerized applications may include such things as base operating system, libraries, and environment variables. A developer using a containerized application development system can assemble a container image (or simply "image") for the application that acts as a template for execution of the containerized application. This makes containerized applications self-sufficient and capable of running under a variety of operating systems, which simplifies deployment of the application across a variety of client systems.

One of the advantages of containerized applications is the ease with which they can be shared and deployed on various systems. As a result, numerous public and restricted container registries and repositories exist that allow users to share and update containerized applications. Some registries expose posted containerized applications to the general public, while other registries allow users to limit access to posted container images. Registry software is also available that allows users and organizations to create and maintain their own container registry server. These restricted repositories provide a convenient way for development teams to collaborate and test software development projects having various different combinations of dependencies on different operating systems without the need to reconfigure a workstation.

SUMMARY

The illustrative embodiments provide for remote direct memory access for container-enabled networks. An embodiment includes mapping, responsive to receiving a request for a container image from a container host, the requested container image to a first computer memory on a registry server. The embodiment also includes exposing a window storing the mapped container image to the container host using a collective window-creation call with the container host. The embodiment also includes processing a Remote Direct Memory Access (RDMA) data transfer request to select a lock type for the window during the RDMA data transfer. The embodiment also includes imposing the selected lock type on the window during the RDMA data transfer. The embodiment also includes releasing the selected lock type from the window upon detecting completion of the RDMA data transfer. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
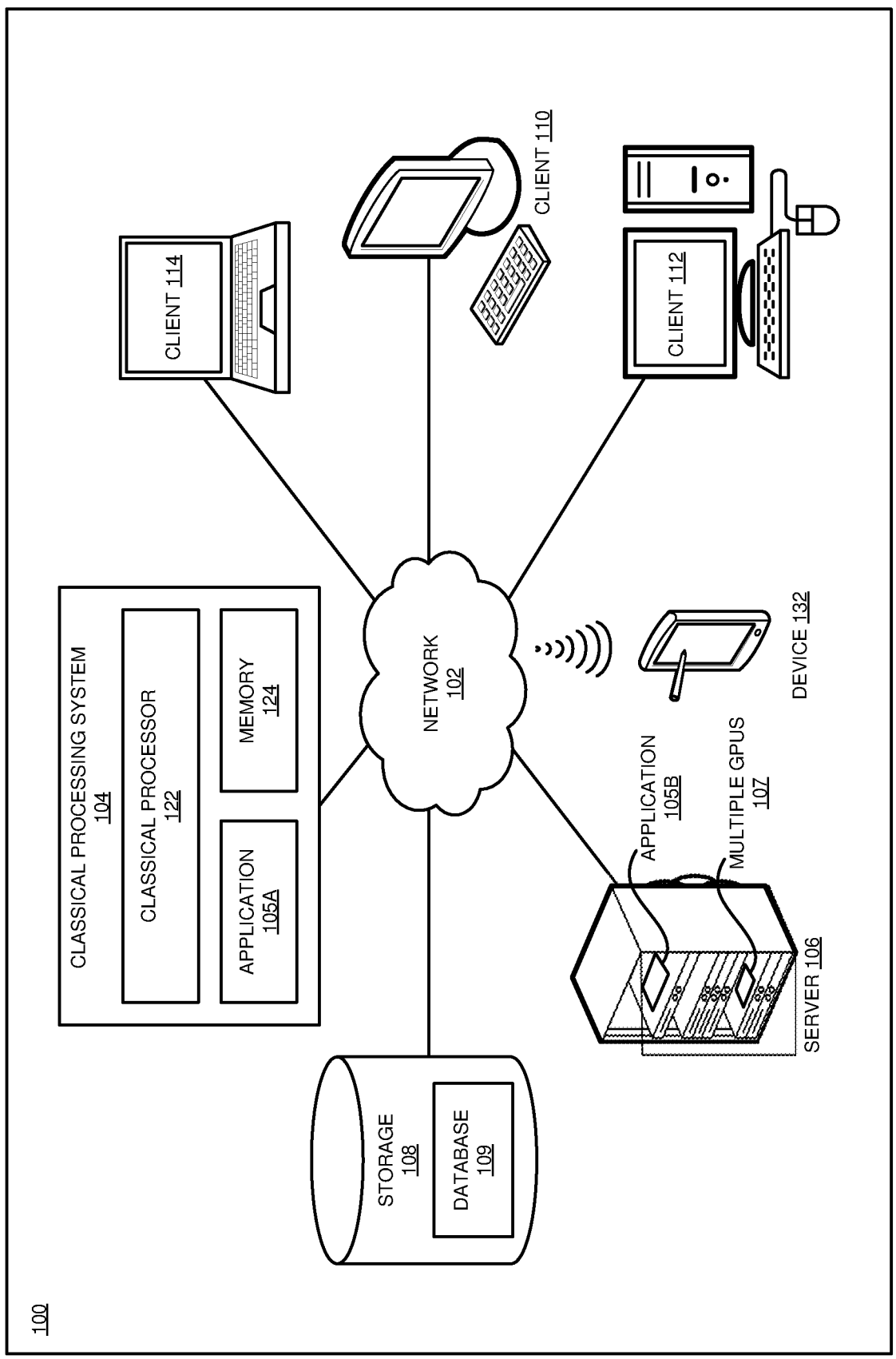
FIG. 1 depicts a block diagram of a network of data processing systems in which illustrative embodiments may be implemented.

A typical container-enabled network includes a registry server and one or more container hosts. The registry server hosts a library of container images that are updated and distributed to the container hosts. A container host instantiates a container image as a container in runtime memory to run the image as an application. Containers are used for a variety of applications, particularly where reliability is a key concern. Containerizing an application provides for improved reliability because the application is packaged with all of that application's dependencies in order to preserve the application's preferred environment.

Embodiments recognize that the systems involved in exchanging container images across a network can benefit from instead using RDMA to transfer the container images. In prior systems, images are pulled from a registry server to container hosts and updated images are pushed from the container hosts to the registry server. These image containers are transferred using a traditional socket-based Application Programming Interface (API), for example over Ethernet using a TCP/IP two-sided communication protocol. However, when using TCP/IP to transmit multi-gigabyte images to a cluster of hosts that may have hundreds or thousands of hosts, a high load is incurred in processing TCP/IP protocol in the registry and host CPUs and on the network.

Embodiments disclosed herein address this problem by using one-sided RDMA instead of traditional two-sided socket-based TCP/IP. The terms "Remote Direct Memory Access" and "RDMA" as used herein include, for example, hardware and/or software and/or infrastructure and/or fabric and/or links and/or adapters and/or architectures that allow direct hardware access for data transfers between local memories of respective nodes without involving the CPUs of any of the nodes. For example, in some embodiments, RDMA refers to a one-sided Message Passing Interface (MPI). RDMA reduces the processing burden on the CPUs. RDMA allows incoming data packets to be transmitted directly to a destination memory location, which eliminates the copying of incoming data by the CPU.

Embodiments also recognize that systems involved in responding to version checks from container hosts over a traditional two-sided TCP/IP connection eventually become over-burdened as the size of the host cluster continues to increase because of the CPU burden and PCI bottleneck caused by TCP/IP network communications. In prior systems, a process running a container image on a container host makes a query using two-sided TCP/IP to a registry server to check if the version of the container image on the registry server matches the version of the container image local to the container host. Such processes present scaling problems, as a container registry host can become overwhelmed with such TCP/IP requests, producing a significant bottleneck.

Embodiments address this problem by eliminating the need for the registry host to be involved in the query of container image IDs in the registry by opening an RMA (remote memory access) window between the container host and the registry server. In some embodiments, the registry server window will contain a metadata segment with a set of container image names associated with IDs. This metadata segment will be an accurate representation of the images in the registry at any given time.

The container hosts can obtain a read lock to the registry server's window and read directly from the window, effectively eliminating the registry server's CPU from having to handle requests from container hosts. The registry server can update a metadata segment that is representative of a version of a container image when a new image ID is pushed, by acquiring a write lock on the window.

In some embodiments, a registry server and a container host are connected by an InfiniBand network that uses a switched fabric topology that uses fiber optic connections and set up RDMA transfers to go over the fiber network. In some such embodiments, the fiber network allows for RDMA from a PCIE device.

Embodiments disclosed herein further recognize that some have suggested using RDMA for data communication in database replication systems. In this regard, United States Patent Application Publication US 2015/0006478A1 by Raymond et al. suggests the use of RDMA by a database for writing and retrieving blocks of data when communicating with remote servers for data replication. Since the contents of a block of data may change while being written or retrieved, the replication system checks a change index to determine if a change occurred in the written or retrieved data block while the replication system performed the RDMA write or retrieval. If so, the replication system repeats the writing or retrieving of the data block until the writing or retrieving can be accomplished without the data block being changed during the write or retrieve process. Since data blocks of a database are accessed and replicated rather than the database as a whole, the repeated reads and writes would likewise typically involve blocks of data rather than the database as a whole. However, such repeated read and write processes are undesirable for RDMA data transfers of container images that are retrieved or written as a whole between a registry server and one or more container hosts. The undesirable nature of the repeated reads and writes is compounded as the number of container hosts increases, for example to hundreds or thousands of container hosts, and/or as the size of a container image increases, for example to a gigabyte, 10 gigabytes, or more. Embodiments address this problem by including RDMA communication that includes a one-sided MPI that uses passive target synchronization, in which origin and target devices are involved in creation and allocation of an area of memory, or "window," that is locked during the RDMA data transfers. This eliminates the need to check for changes that may have occurred during the RDMA transfer and likewise eliminates the need for repeated reads or writes due to such changes.

The illustrative embodiments provide for RDMA by mapping, responsive to receiving a request for a container image from a container host, the requested container image to a first computer memory on a registry server. The embodiment also includes exposing a window storing the mapped container image to the container host using a collective window-creation call with the container host. The embodiment also includes processing a RDMA data transfer request to select a lock type for the window during the RDMA data transfer. The embodiment also includes imposing the selected lock type on the window during the RDMA data transfer. The embodiment also includes releasing the selected lock type from the window upon detecting completion of the RDMA data transfer.

Some embodiments also provide for remote direct memory access for container-enabled networks. An embodiment includes generating, responsive to receiving a container image from a first container host, metadata representative of a current version of the container image. The embodiment also includes exposing a window storing the metadata to a second container host using a collective window-creation call with the first and second container host. The embodiment also includes processing a RDMA data transfer request to select a lock type for the window during the RDMA data transfer. The embodiment also includes imposing the selected lock type on the window during the RDMA data transfer. The embodiment also includes releasing the selected lock type from the window upon detecting completion of the RDMA data transfer. Other embodiments of this aspect include corresponding computer systems, apparatus, and computer programs recorded on one or more computer storage devices, each configured to perform the actions of the embodiment.

The illustrative embodiments provide for remote direct memory access for container-enabled networks. An embodiment includes exposing a container image to a first computer memory on a registry server. The embodiment also includes exposing a window storing the mapped container image to a container host using a collective window-creation call with the container host. The embodiment also includes imposing, responsive to a PUSH type of RDMA data transfer request to push a new version of the container image to the registry server, a selected lock type on the window during the RDMA data transfer. The embodiment also includes releasing, responsive to completion of the PUSH type of RDMA data transfer request, the selected lock type from the window. The embodiment also includes imposing the selected lock type on metadata for the container image. The embodiment also includes writing data representative of the new version of the container image to the metadata. The embodiment also includes releasing the selected lock type from the metadata. Other embodiments of this aspect include corresponding computer systems, apparatus, and computer programs recorded on one or more computer storage devices, each configured to perform the actions of the embodiment.

Other embodiments of this aspect include corresponding computer systems, apparatus, and computer programs recorded on one or more computer storage devices, each configured to perform the actions of the embodiment. For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
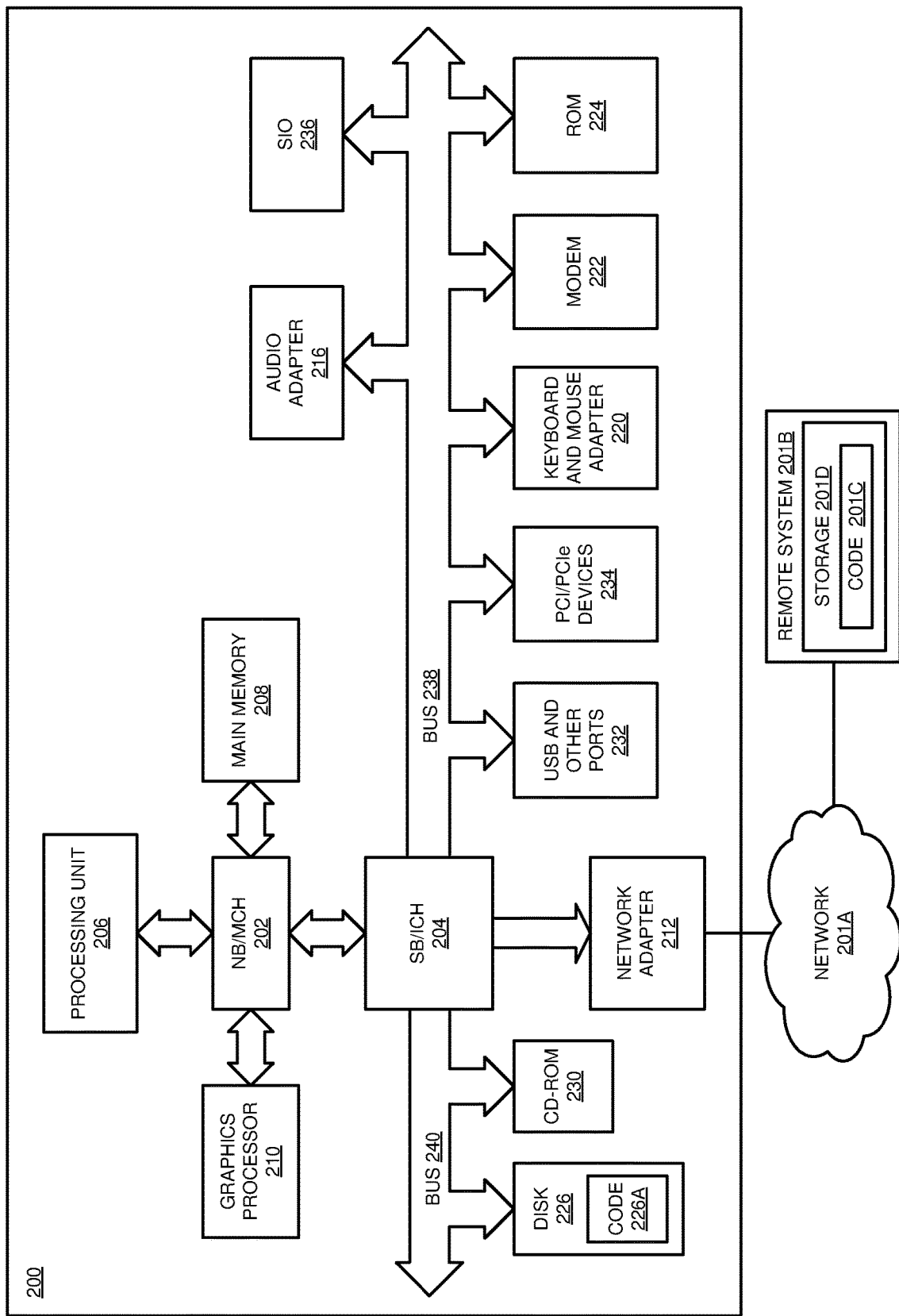
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes an application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by application 105B such as initiating processes described herein of the registry server. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a host-server container-enabled environment in which the illustrative embodiments may be implemented. A host-server container-enabled environment enables containerized software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
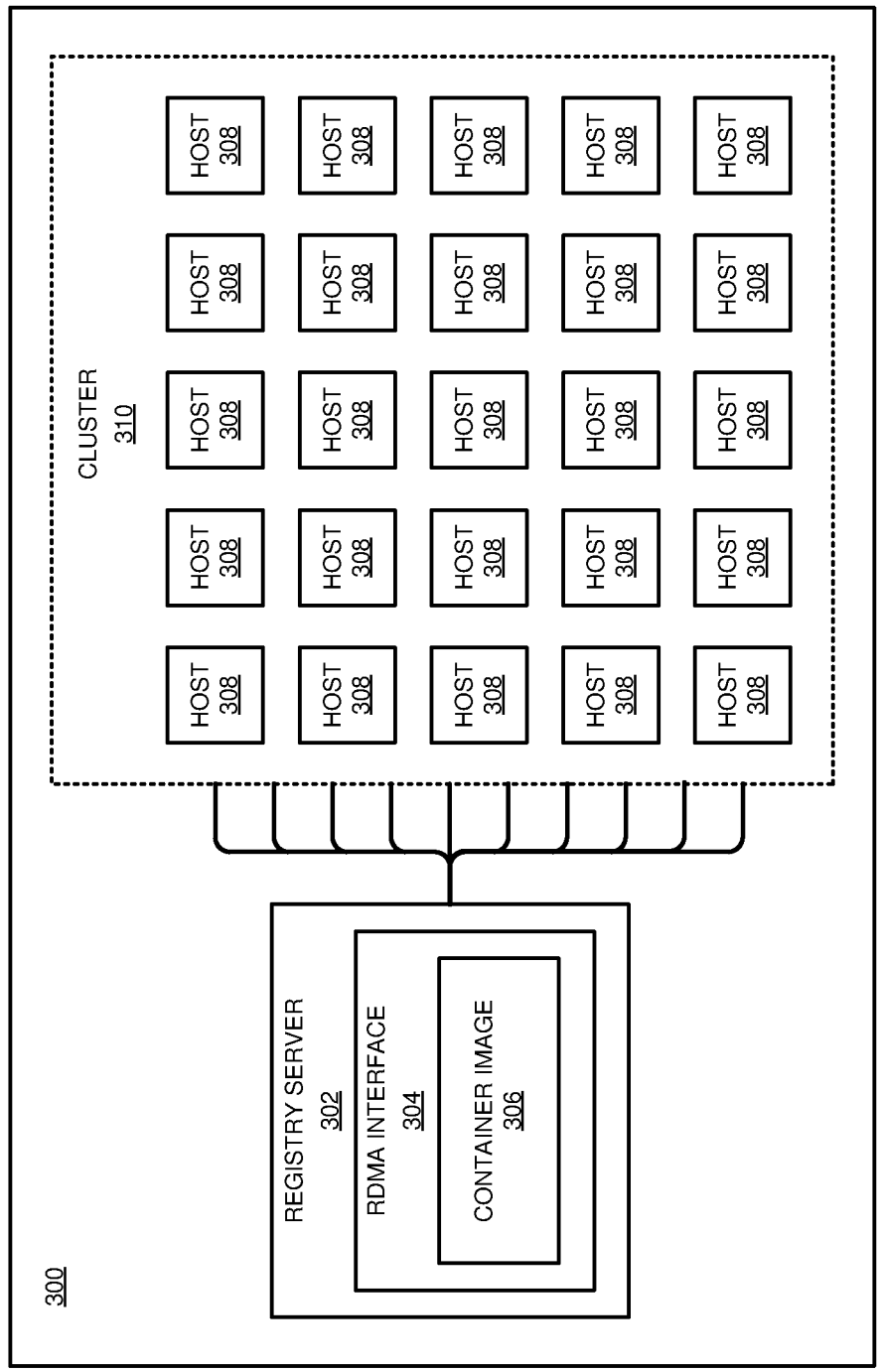
FIG. 3 depicts a block diagram of a host-server container-enabled environment in accordance with an illustrative embodiment.

With reference to FIG. 3, this figure depicts a block diagram of an example host-server container-enabled environment 300 in accordance with an illustrative embodiment. The example embodiment includes a registry server 302. In a particular embodiment, registry server 302 is an example of server 106 of FIG. 1.

In some embodiments, the registry server 302 includes an RDMA interface 304 for communicating container image 306 to a cluster 310 of hosts 308 using an RDMA protocol. In actual implementations, the cluster 310 includes hundreds or thousands of hosts 308. In alternative embodiments, the registry server 302 includes some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

Figure 4:
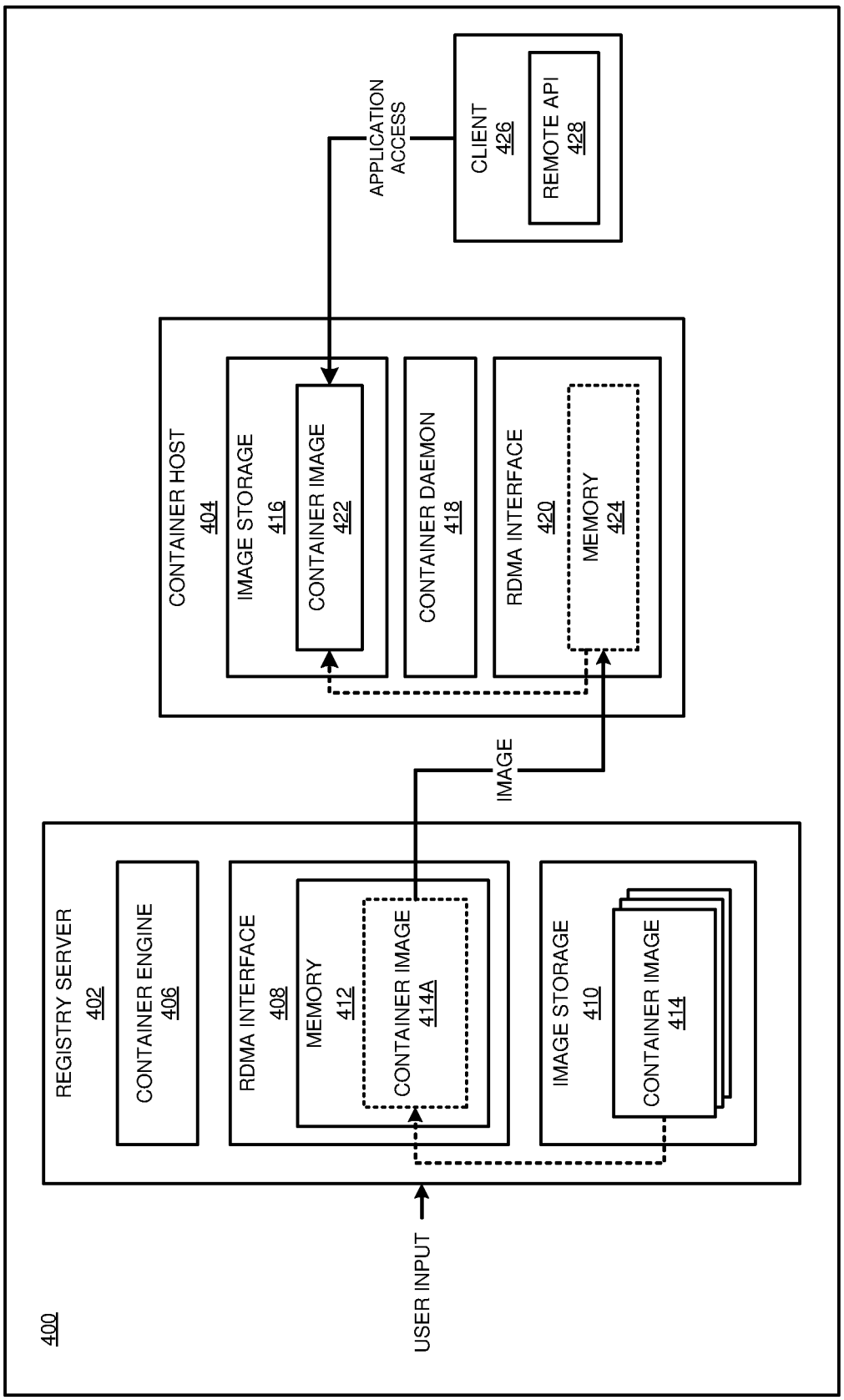
FIG. 4 depicts a block diagram of a registry server and a container host of a host-server container-enabled environment in accordance with an illustrative embodiment.

With reference to FIG. 4, this figure depicts a block diagram of an example configuration 400 in accordance with an illustrative embodiment. The example embodiment includes a registry server 402 in communication with a container host 404. In a particular embodiment, registry server 402 is an example of registry server 302 of FIG. 3, and container host 404 is an example of host 308 of FIG. 3.

In some embodiments, the registry server 402 includes a container engine 406, an RDMA interface 408, and image storage 410. The image storage 410 stores one or more container images 414 that are available for distribution to the container host 404. The RDMA interface 408 includes memory 412 that the RDMA interface 408 maps to one or more container images 414 to create a virtual container image 414A. RDMA interface 408 then exposes to the portion of the memory 412 storing virtual container image 414A to the container host 404 in order to transfer the container image 414 to the container host 404 via an RDMA protocol. In alternative embodiments, the registry server 402 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In some embodiments, the container host 404 includes image storage 416 for storing a container image 422. In some embodiments, the container image 422 is a copy of the container image 414 received from registry server 402. The container host 404 also includes a container daemon 418 and an RDMA interface 420 that includes memory 424. In some embodiments, the container daemon 418 exposes a remote API 428 on a client system 426 to allow a remote user to administer certain aspects of the operation of the container host 404. In alternative embodiments, the container host 404 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In some embodiments, the transfer of the container image 414 from the registry server 402 to the container host 404 is performed using one-sided communication, such as a one-sided MPI. In some such embodiments, the registry server 402 and the container host 404 (and any other host 308 in the case of a host cluster 310) make a collective window-create call to expose a portion of memory of the registry server 402 for data transfer. Specifically, the registry server 402 exposes a portion of its memory that stores the container image 414A to be transferred. For example, in the illustrated embodiment, the registry server 402 maps the container image 414 to a portion of the memory 412, which it then exposes for RDMA transfer to the container host 404.

In some embodiments, the transfer of the container image 414 from the registry server 402 to the container host 404 is performed using one-sided communication, such as a one-sided MPI. In some such embodiments, the registry server 402 and the container host 404 make an area of memory—or "window"—available to one-sided transfers. For example, in some embodiments, the registry server 402 and container host 404 (and any other host 308 in the case of a host cluster 310) make a collective window-create call to make respective portions of memory available for a data transfer.

In the case of the device hosting data to be transferred, the portion of memory made available is the portion of memory that holds the data to be transferred. For example, in the illustrated embodiment, the registry server 402 maps the container image 414 to memory 412 to make virtual container image 414A, and then makes the portion of memory 412 holding container image 414A available for transfer to container host 404.

In some embodiments, the container host 404 then uses passive target synchronization to read the container image 414. The container host 404 remotely locks the window on registry server 402 holding virtual container image 414A, performs a one-sided transfer, and then remotely unlocks the window on the registry server 402. In some embodiments, there are two types of locks that the host 404 uses: a shared lock used for GET calls that allows multiple hosts to read from the window, and an exclusive lock for PUT calls that allows only one host to write to the window to prevent conflicting data from being written to the window.

Figure 5:
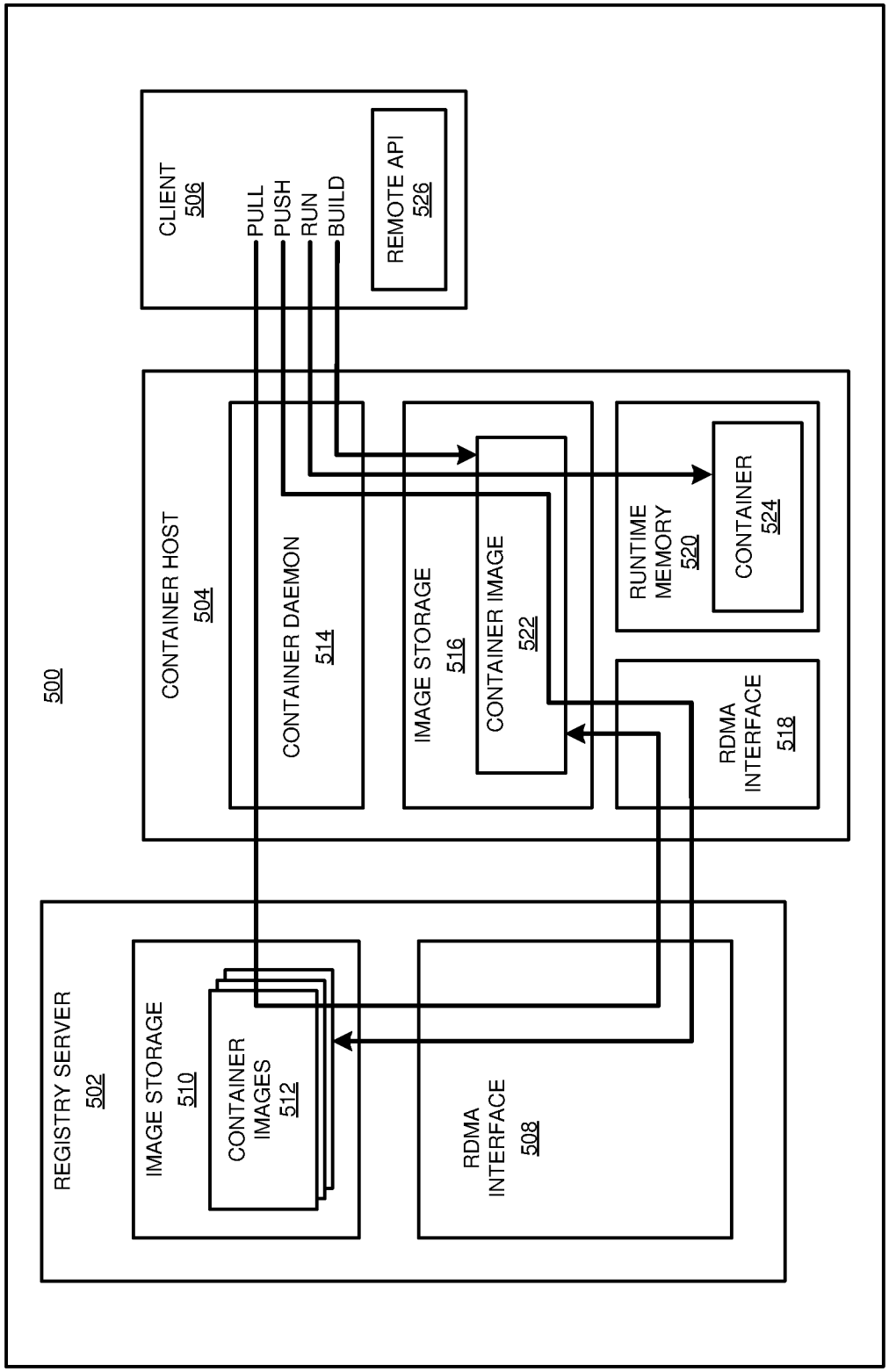
FIG. 5 depicts a block diagram of conceptual operation paths for exemplary operations of a host-server container-enabled environment in accordance with an illustrative embodiment.

With reference to FIG. 5, this figure depicts conceptual operation paths for exemplary operations of a configuration 500 in accordance with an illustrative embodiment. The conceptional operation paths shown in FIG. 5 are non-limiting and high-level examples only provided to aid in the understanding of the present disclosure. The example embodiment includes a registry server 502 in communication with a container host 504. In a particular embodiment, registry server 502 is an example of registry server 302 or registry server 402 of FIG. 4, and container host 504 is an example of host 308 of FIG. 3 or container host 404 of FIG. 4.

In some embodiments, the registry server 402 includes an RDMA interface 508 and image storage 510. The image storage 510 stores one or more container images 512 that are available for distribution to the container host 504. In some embodiments, the container host 504 includes a container daemon 514, image storage 516 for storing a container image 522, an RDMA interface 518, and runtime memory 520. At runtime, the runtime memory 520 stores a container 524, which is an executing version of the container image 522. The container daemon 514 exposes a remote API 526 on a client system 506 to allow a remote user to administer certain aspects of the operation of the container host 504. For example, example operations include PULL, PUSH, RUN, and BUILD operations.

In some embodiments, the BUILD call is used to instruct the container host 504 to describe an application and any packages that the application requires in a container image 522. At a high level, in some embodiments, the BUILD operation is initiated by client system 506 issuing a command to container daemon 514 to construct the container image 522 in the image storage 516.

In some embodiments, the RUN call is used to instruct the container host 504 to execute the application defined by container image 522. At a high level, in some embodiments, the RUN operation is initiated by client system 506 issuing a command to container daemon 514 to execute a containerized application corresponding to container image 522. In response, the container daemon 514 instantiates the container image 522 as a container 524 in runtime memory 520.

In some embodiments, the GET call described with reference to FIG. 4 is an example of a PULL operation used by container host 504 to use RDMA to get a copy of one or more container images 512. At a high level, in some embodiments, the PULL operation is initiated by client system 506 issuing a command to container daemon 514 to get a copy of one or more container images 512 from registry server 502. This triggers registry server 502 making one or more container images 512 available using a collective window-create call, and mmap and mbind the one or more container images 512 to an exposed window in memory accessible via RDMA interface 508. This leads to container host 504 performing a GET to obtain a copy of one or more container images 512 and store the image(s) in image storage 516 as container image(s) 522.

In some embodiments, a PUT call in the direction opposite the GET described with reference to FIG. 4 would be an example of a PUSH operation used by container host 504 to use RDMA to send a copy of one or more container images 512 to registry server 402. At a high level, in some embodiments, the PUSH operation is initiated by client system 506 issuing a command to container daemon 514 to send a copy of container image 522 to registry server 502. This triggers container host 504 making container image 522 available using a collective window-create call, and mmap and mbind the container image 522 to an exposed window in memory accessible via RDMA interface 518. This leads to container host 504 performing a PUT to send a copy of container image 522 to RDMA interface 508, which in turn store the received image in image storage 510 as container image 512.

Figure 6:
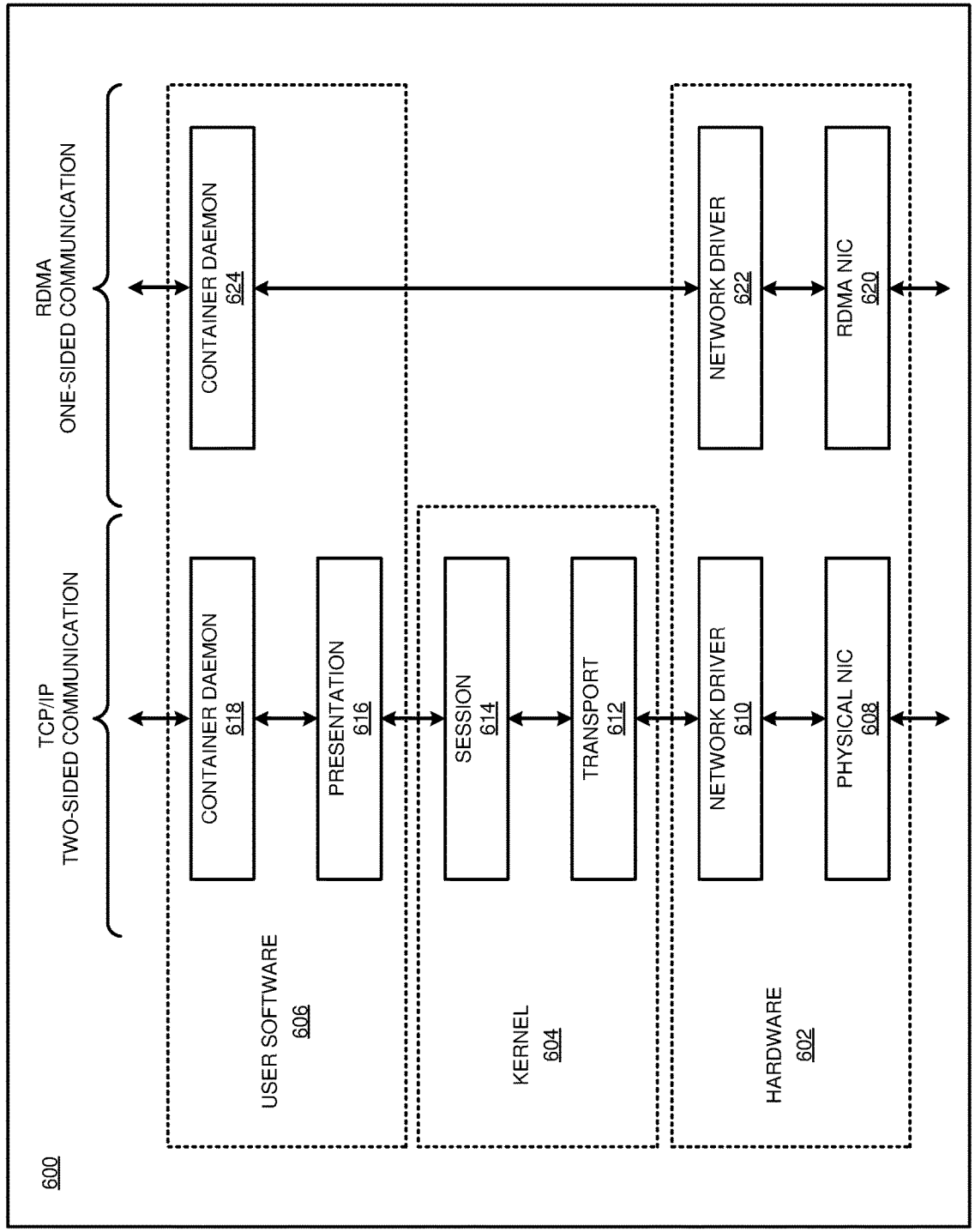
FIG. 6 depicts a block diagram of an example configuration of one- and two-sided communication protocols in accordance with an illustrative embodiment.

With reference to FIG. 6, this figure depicts a block diagram of an example configuration 600 of one- and two-sided communication protocols in accordance with an illustrative embodiment. In an embodiment, the illustrated example one- and two-sided communication protocols are examples of communication protocols used by the registry server 502 and container host 504 in FIG. 5, registry server 402 and container host 404 in FIG. 4, and registry server 302 and hosts 308 in FIG. 3.

In a particular embodiment, two-sided TCP/IP communication protocol includes hardware layers 602, kernel layers 604, and user software layers 606. For the two-sided protocol, the hardware layers 602 include a physical NIC 608 and a network driver 610. The kernel layers 604 include a transport layer 612 that defines how to address the physical locations of devices on the network, and a session layer 614 that keeps track network connections to ensure that it sends the right response to the right computer. The user software layers 606 include a presentation layer 616 that presents data received via the network in a form that the applications on the host can understand. While two-sided TCP/IP is adequate for some network traffic, such as network communications between the client system 506 and the container daemon 514 in FIG. 5, it suffers performance slow-downs for very large files, such as transporting container images that are a gigabyte or larger between the registry server 502 and the container host 504. One reason for this is the so-called "PCI bottleneck" that refers to overhead between the network and application layers used to interrupt the CPU so the CPU will copy the data to from the NIC to the PCI bus.

In a particular embodiment, the registry server 502 and container host 504 use one-sided RDMA communication protocol to transport container images. RDMA includes hardware layers 602 and user software layers 606 but omits kernel layers 604. For the one-sided protocol, the hardware layers 602 include an RDMA NIC 620 and a network driver 622, and the user software layers 606 include a container daemon 624. Thus, RDMA allow for direct transport of data between memories of different nodes without involving the CPU, thereby eliminating the PCI bottleneck and improving network performance.

Figure 7:
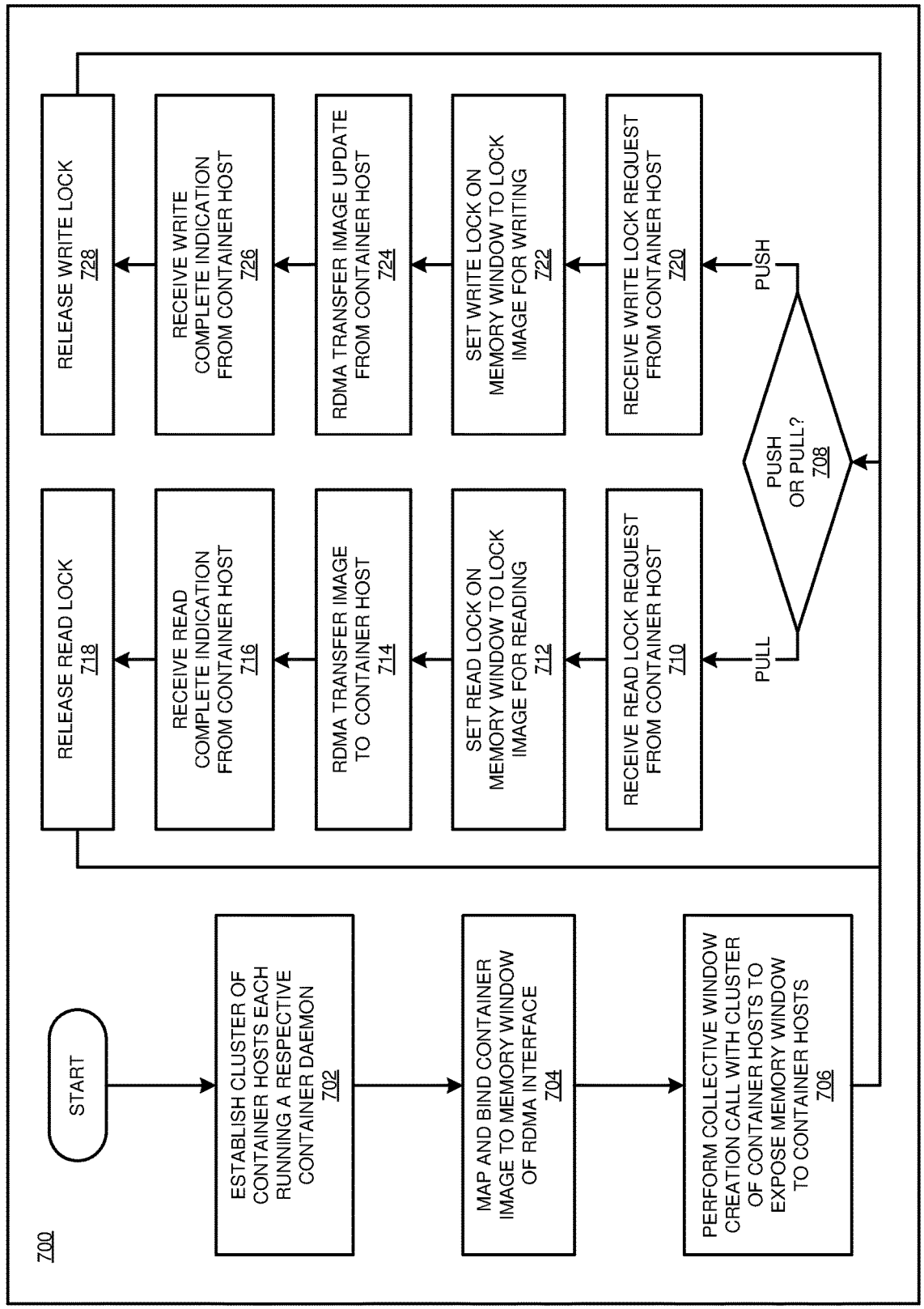
FIG. 7 depicts a flowchart of an example process for RDMA-enabled image transfers for a host-server container-enabled environment in accordance with an illustrative embodiment.

With reference to FIG. 7 this figure depicts a flowchart of an example process 700 for operations in a container-enabled network in accordance with an illustrative embodiment. In a particular embodiment, the registry server 302, registry server 402, and registry server 502 carry out the process 700.

In an embodiment, at block 702, the server establishes a cluster of container hosts each running a respective container daemon. In an embodiment, at block 704, the server maps and binds a container image to a memory window of an RDMA interface in preparation for making it available to the container hosts. In an embodiment, at block 706, the server performs a collective window-creation call with the cluster of container hosts to expose a memory window on the server for PUSH and PULL operations by the container hosts. Here, the container hosts are always the origin devices, so the container hosts do not need to expose memory, but they are part of the collective call in order to receive the information about the area of memory on the server that is exposed for PUSH and PULL operations. In an embodiment, at block 708, the server awaits a PUSH or PULL operation from one or more of the hosts.

For PULL operations, the server performs blocks 710-718. In an embodiment, at block 710, the server receives a read lock request from a container host in preparation for a PULL operation. In an embodiment, at block 712, the server sets the read lock on the exposed memory window to lock the image for reading. In an embodiment, at block 714, the server RDMA transfers the container image to the calling container host. Upon completion, at block 716, the server receives a read complete indication from the calling container host. In an embodiment, at block 718, the server responds by releasing the read lock.

For PUSH operations, the server performs blocks 720-728. In an embodiment, at block 720, the server receives a write lock request from a container host in preparation for a PUSH operation. In an embodiment, at block 722, the server sets the write lock on the exposed memory window to lock the image for writing. In an embodiment, at block 724, the server RDMA transfers the container image from the calling container host. Upon completion, at block 726, the server receives a write complete indication from the calling container host. In an embodiment, at block 728, the server responds by releasing the write lock.

Figure 8:
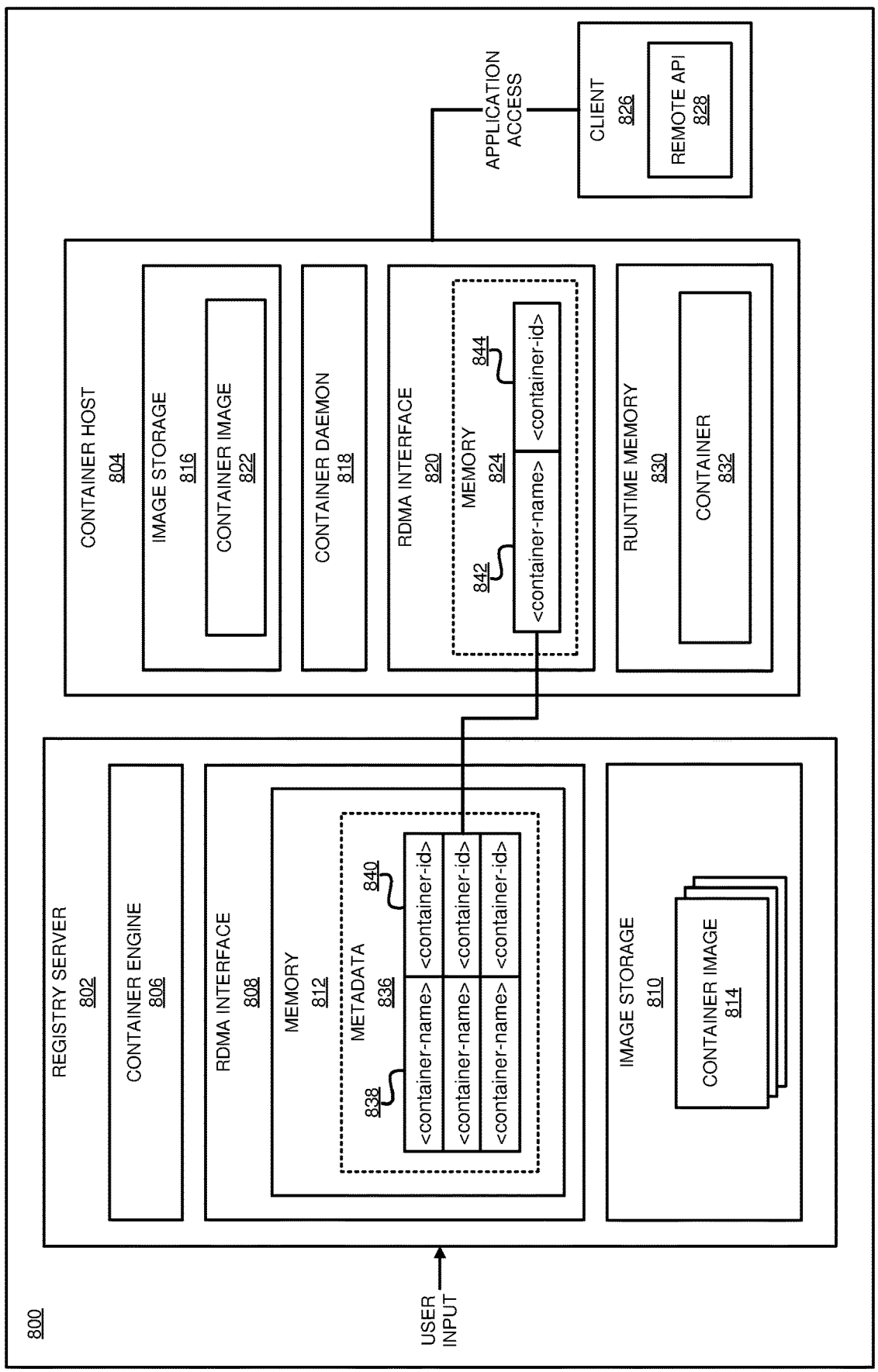
FIG. 8 depicts a block diagram of a registry server and a container host of a host-server container-enabled environment in accordance with an illustrative embodiment.

With reference to FIG. 8, this figure depicts a block diagram of an example configuration 800 in accordance with an illustrative embodiment. The example embodiment includes a registry server 802 in communication with a container host 804. In a particular embodiment, registry server 802 is an example of registry server 302 of FIG. 3, and container host 804 is an example of host 308 of FIG. 3.

In some embodiments, the registry server 802 includes a container engine 806, an RDMA interface 808, and image storage 810. The image storage 810 stores one or more container images 814 that are available for distribution to the container host 804. The RDMA interface 808 includes memory 812 that the RDMA interface 808 maps to one or more container images 814 to create a virtual container image. In alternative embodiments, the registry server 802 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the container host 804 includes image storage 816 for storing a container image 822. In some embodiments, the container image 822 is a copy of the container image 814 received from registry server 802. The container host 804 also includes a container daemon 818 and an RDMA interface 820 that includes memory 824. In some embodiments, the container daemon 818 exposes a remote API 828 on a client system 826 to allow a remote user to administer certain aspects of the operation of the container host 804. In alternative embodiments, the container host 804 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the transfer of the container image 814 from the registry server 802 to the container host 804 is performed using one-sided communication, such as a one-sided MPI. In some such embodiments, the registry server 802 and the container host 804 (and any other host 308 in the case of a host cluster 310) make a collective window-create call to expose a portion of memory of the registry server 802 for data transfer. Specifically, the registry server 802 exposes a portion of its memory that stores the container image 814 to be transferred. For example, in the illustrated embodiment, the registry server 802 maps the container image 814 to a portion of the memory 812, which it then exposes for RDMA transfer to the container host 804.

In some embodiments, the container host 804 then uses passive target synchronization to read the container image 814. The container host 804 remotely locks the window on registry server 802 holding virtual container image, performs a one-sided transfer, and then remotely unlocks the window on the registry server 802. In some embodiments, there are two types of locks that the container host 804 uses: a shared lock used for GET calls that allows multiple hosts to read from the window, and an exclusive lock for PUT calls that allows only one host to write to the window to prevent conflicting data from being written to the window.

In some embodiments, while the container host 804 is running a container 832 in a runtime memory 830, a process on the container host 804 makes a query to a registry server 802 using a TCP/IP two-sided communication protocol to check if the container image 822 on the container host 804 is up to date with the container image 814 for the same application on the registry server 802. However, performing this process using a TCP/IP two-sided communication protocol presents scaling problems. For example, a registry server that stores container images for hundreds or thousands of container hosts can become overwhelmed by the large volume of TCP/IP requests because of the burden placed on the server's CPU(s) and PCI or other such interconnect bus(es), producing a significant bottleneck.

Alternative embodiments eliminate the registry server's CPU(s) and PCI or other such interconnect bus(es) from the process of handling such image-version queries from container hosts by exposing a window for RDMA-read calls from container hosts.

Still referring to FIG. 8, in some embodiments, the registry server 802 stores metadata 836 in memory 812 that associates a version-indifferent static identifier—i.e., an identifier that remains the same as the version changes—of a container image 814 with a version identifier that is unique to the current version of the container image 814 in a hash table or other data structure. In the illustrated embodiment, the metadata 836 includes a container name 838 that serves as a version-indifferent static identifier of a container image 814. In the metadata 836, each container name 838 is unique to a specific container image 814. In the illustrated embodiment, the metadata 836 also includes a container ID 840 that serves as a version-specific identifier of a container image 814. In the metadata 836, each container ID 840 is unique to a specific version of a specific container image 814. In some embodiments, the metadata 836 includes additional information to confirm the accuracy of the indicated version, such as checksum information.

In some embodiments, the container host 804 obtains an RDMA-read lock of the registry host's window that stores the metadata 836 and read directly from the window, effectively eliminating the registry host's CPU(s) from the process of handling version requests from the container host 804. In some embodiments, the registry server 802 updates the metadata 836 when a new version of a container image 814 having a new and unique container-id is pushed from a container host 804 by acquiring a write lock on the window that stores the metadata 836.

In some embodiments, the RDMA interface 808 includes memory 812 that the RDMA interface 808 uses to store metadata 836. RDMA interface 808 exposes the portion of the memory 812 storing metadata 836 to the container host(s) 804 in order to allow the container host(s) 804 to perform RDMA-reads of the metadata 836 by transferring the metadata 836 to the calling container host 804 via an RDMA protocol. In some embodiments, the transfer of the metadata 836 from the registry server 802 to the container host 804 is performed using one-sided communication, such as a one-sided MPI.

In some embodiments, the transfer of the metadata 836 from the registry server 802 to the container host 804 is performed using one-sided communication, such as a one-sided MPI. In some such embodiments, the registry server 802 and the container host 804 (and any other host 308 in the case of a host cluster 310) make a collective window-create call to expose a portion of memory of the registry server 802 for data transfer. Specifically, the registry server 802 exposes a portion of its memory 812 that stores the metadata 836 to be transferred. In some embodiments, the registry server 802 maps the metadata 836 from elsewhere to a portion of the memory 812, which it then exposes for RDMA transfer to the container host 804.

In some embodiments, the container host 804 uses passive target synchronization to read the metadata 836. The container host 804 remotely locks the window on registry server 802 holding the metadata 836, performs a one-sided transfer, and then remotely unlocks the window on the registry server 802. In some embodiments, the container host 804 uses a shared lock and a GET call to read the metadata 836 from the registry server 802.

Figure 9:
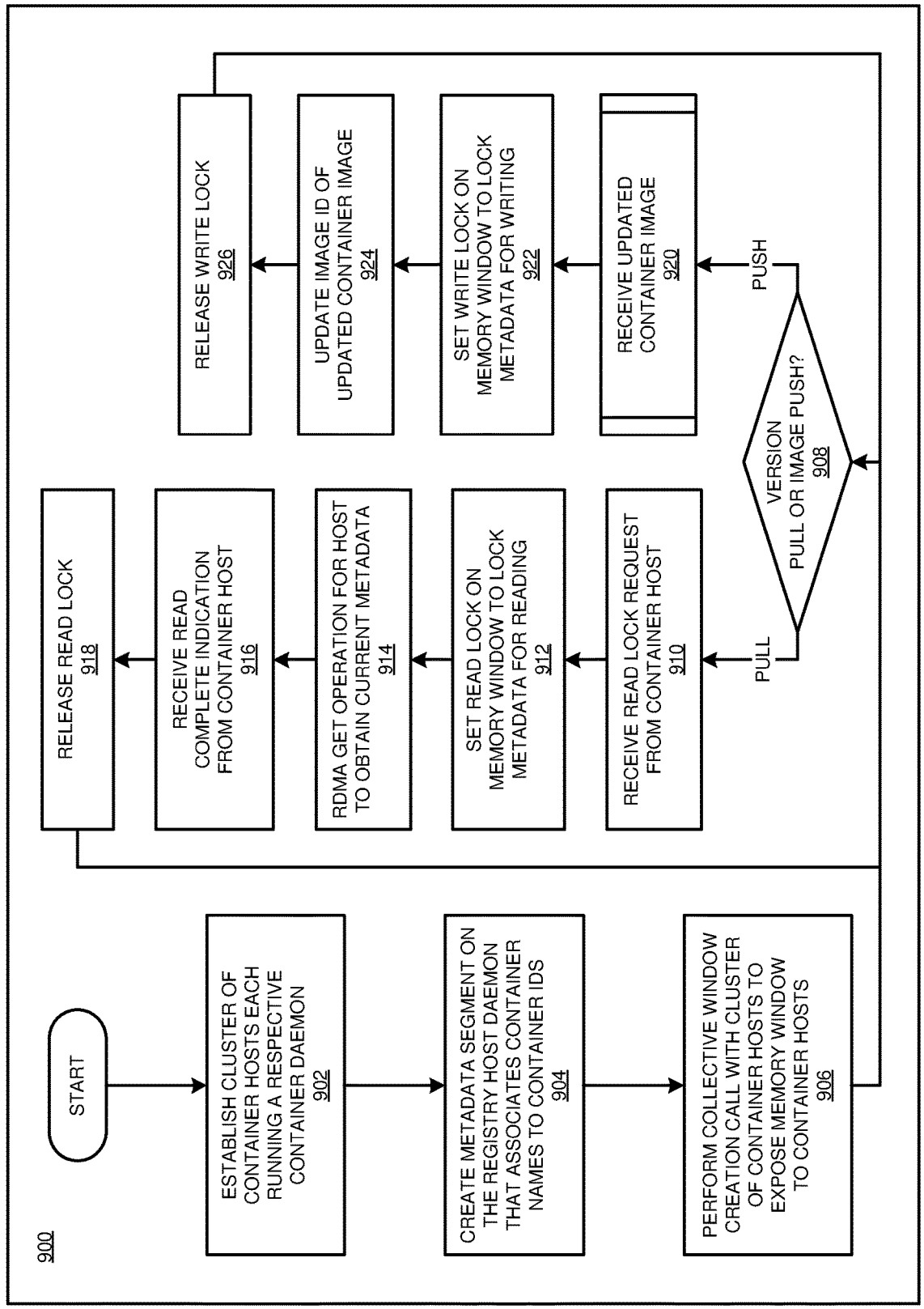
FIG. 9 depicts a flowchart of an example process RDMA-enabled image version management for a host-server container-enabled environment in accordance with an illustrative embodiment.

With reference to FIG. 9 this figure depicts a flowchart of an example process 900 for RDMA-based version management operations in a container-enabled network in accordance with an illustrative embodiment. In a particular embodiment, the registry server 802 carries out the process 900.

In an embodiment, at block 902, the server establishes a cluster of container hosts each running a respective container daemon. In an embodiment, at block 904, the server maps and binds a container image to a memory window of an RDMA interface in preparation for making it available to the container hosts. In an embodiment, at block 906, the server performs a collective window-creation call with the cluster of container hosts to expose a memory window on the server for container-image PUSH and version PULL operations by the container hosts. In some embodiments, the container hosts are always the origin devices, so the container hosts do not need to expose memory, but they are part of the collective call in order to receive the information about the area of memory on the server that is exposed for container-image PUSH and version PULL operations. In an embodiment, at block 908, the server awaits a container-image PUSH or version PULL operation from one or more of the hosts. In some embodiments, the server also awaits other types of operations not addressed here, such as a container-image PULL operation as shown in FIG. 7.

For version PULL operations, the server performs blocks 910-918. In an embodiment, at block 910, the server receives a read lock request from a container host in preparation for a GET operation. In an embodiment, at block 912, the server sets the read lock on the exposed memory window to lock the metadata for reading. In an embodiment, at block 914, the server RDMA-transfers the metadata to the calling container host. Upon completion, at block 916, the server receives a read complete indication from the calling container host. In an embodiment, at block 918, the server responds by releasing the read lock.

In some embodiments, the server updates the version information in the metadata whenever a new version is received by the server. In such embodiments, the version in the metadata is updated in blocks 922-926 after receiving an RDMA-transferred container image in block 920. In some embodiments, at block 920, the receiver follows the process shown as blocks 710-718 in FIG. 7. Next, at block 922, the server sets the write lock on the exposed memory window to lock the metadata for writing. In an embodiment, at block 924, the server updates the version identifier that is unique to the updated version of the container image received at block 920. Upon completion, at block 926, the server releases the write lock.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
    mapping, responsive to receiving a request for receipt of a copy of a container image from a container host, the requested container image to a first computer memory on a registry server;
    exposing, to the container host in preparation for a first Remote Direct Memory Access (RDMA) data transfer, a window of an RDMA interface storing the mapped container image by making, together with the container host, a Message Passing Interface (MPI) collective window-creation call;
    processing a first RDMA data transfer request to select a first lock type for the window during the first RDMA data transfer;
    imposing the selected first lock type on the window during the first RDMA data transfer;
    releasing the selected first lock type from the window upon detecting completion of the first RDMA data transfer; and processing a second RDMA data transfer request for a second RDMA data transfer, the second RDMA data transfer comprising receiving a new version of the container image from the container host, the processing comprising selecting a second lock type that is different from the first lock type.

2. The computer implemented method of claim 1, wherein the requested container image is stored in a second computer memory on the registry server.

3. The computer implemented method of claim 2, wherein the mapping includes mapping the second computer memory to the first computer memory.

4. The computer implemented method of claim 1, wherein the first data transfer request includes a PULL request from the container host.

5. The computer implemented method of claim 4, wherein the selected first lock type is a shared lock that allows multiple hosts to read from the window.

6. The computer implemented method of claim 4, wherein the second data transfer request includes a PUSH request from the container host.

7. The computer implemented method of claim 6, wherein the selected second lock type is an exclusive lock that allows the container host to write to the window while preventing other hosts from writing to the window.

8. The computer implemented method of claim 1, wherein the first RDMA data transfer is conducted using a one-sided communication protocol.

9. The computer implemented method of claim 8, wherein the one-sided communication protocol comprises a hardware layer immediately followed by an application layer.

10. A computer usable program product for RDMA-based image transfers, the computer program product comprising one or more computer readable storage media, and program instructions collectively stored on the one or more computer readable storage media, the program instructions executable by a processor to cause the processor to perform operations comprising:
    mapping, responsive to receiving a request for receipt of a copy of a container image from a container host, the requested container image to a first computer memory on a registry server;
    exposing, to the container host in preparation for a first Remote Direct Memory Access (RDMA) data transfer, a window of an RDMA interface storing the mapped container image by making, together with the container host, a Message Passing Interface (MPI) collective window-creation call;
    processing a first RDMA data transfer request to select a first lock type for the window during the first RDMA data transfer;
    imposing the selected first lock type on the window during the first RDMA data transfer;
    releasing the selected first lock type from the window upon detecting completion of the first RDMA data transfer; and
    processing a second RDMA data transfer request for a second RDMA data transfer, the second RDMA data transfer comprising receiving a new version of the container image from the container host, the processing comprising selecting a second lock type that is different from the first lock type.

11. The computer usable program product of claim 10, wherein the stored program instructions are stored in a computer readable storage device in a data processing system, and wherein the stored program instructions are transferred over a network from a remote data processing system.

12. The computer usable program product of claim 10, wherein the stored program instructions are stored in a computer readable storage device in a server data processing system, and wherein the stored program instructions are downloaded over a network to a remote data processing system for use in a computer readable storage device associated with the remote data processing system, further comprising:
    program instructions to meter use of the stored program instructions associated with the request; and
    program instructions to generate an invoice based on the metered use.

13. The computer usable program product of claim 10, wherein the first data transfer request includes a PULL request from the container host; and
    wherein the selected first lock type is a shared lock that allows multiple hosts to read from the window.

14. The computer usable program product of claim 13, wherein the second data transfer request includes a PUSH request from the container host; and
    wherein the selected second lock type is an exclusive lock that allows the container host to write to the window while preventing other hosts from writing to the window.

15. A computer system comprising a processor and one or more computer readable storage media, and program instructions collectively stored on the one or more computer readable storage media, the program instructions executable by the processor to cause the processor to perform operations comprising:
    mapping, responsive to receiving a request for receipt of a copy of a container image from a container host, the requested container image to a first computer memory on a registry server;
    exposing, to the container host in preparation for a first Remote Direct Memory Access (RDMA) data transfer, a window of an RDMA interface storing the mapped container image by making, together with the container host, a Message Passing Interface (MPI) collective window-creation call;
    processing a first RDMA data transfer request to select a first lock type for the window during the first RDMA data transfer;
    imposing the selected first lock type on the window during the first RDMA data transfer;
    releasing the selected first lock type from the window upon detecting completion of the first RDMA data transfer; and
    processing a second RDMA data transfer request for a second RDMA data transfer, the second RDMA data transfer comprising receiving a new version of the container image from the container host, the processing comprising selecting a second lock type that is different from the first lock type.

16. The computer system of claim 15, wherein the first data transfer request includes a PULL request from the container host; and
    wherein the selected first lock type is a shared lock that allows multiple hosts to read from the window.

17. The computer system of claim 16, wherein the second data transfer request includes a PUSH request from the container host; and wherein the selected second lock type is an exclusive lock that allows the container host to write to the window while preventing other hosts from writing to the window.

18. A computer implemented method comprising:
processing a first Remote Direct Memory Access (RDMA) data transfer request for a first RDMA data transfer, the first RDMA data transfer comprising sending a container image to a first container host, the processing comprising selecting a first lock type for a window of an RDMA interface during the first RDMA data transfer;
processing a second RDMA data transfer request for a second RDMA data transfer, the second RDMA data transfer comprising receiving a new version of the container image from the first container host, the processing comprising selecting a second lock type that is different from the first lock type;
generating, responsive to receiving the new version of the container image from the first container host, metadata representative of the new version of the container image;
exposing, to a second container host in preparation for a third RDMA data transfer, the window of the RDMA interface storing the metadata by making, together with the first and second container hosts, a Message Passing Interface (MPI) collective window-creation call;
processing an RDMA data transfer request to select the first lock type for the window during the third RDMA data transfer;
imposing the selected first lock type on the window during the third RDMA data transfer; and
releasing the selected first lock type from the window upon detecting completion of the third RDMA data transfer.

19. The computer implemented method of claim 18, wherein the third data transfer request includes a PULL request from the second container host.

20. The computer implemented method of claim 19, wherein the selected first lock type is a shared lock that allows multiple hosts to read from the window.

21. The computer implemented method of claim 19, wherein the PULL request includes reading the metadata representative of the new version of the container image.

22. A computer implemented method comprising:
mapping a container image to a first computer memory on a registry server;
exposing, to a container host in preparation for a first Remote Direct Memory Access (RDMA) data transfer, a window of an RDMA interface storing the mapped container image by making, together with the container host, a Message Passing Interface (MPI) collective window-creation call;
imposing, responsive to a PULL type of RDMA data transfer request to pull a copy of the container image from the registry server to the container host, a first selected lock type on the window during the RDMA data transfer;
releasing, responsive to completion of the PULL type of RDMA data transfer request, the first selected lock type from the window;
imposing, responsive to a PUSH type of RDMA data transfer request to push a copy of a new version of the container image from the container host to the registry server, a second selected lock type on the window during the RDMA data transfer;
releasing, responsive to completion of the PUSH type of RDMA data transfer request, the second selected lock type from the window;
imposing the second selected lock type on metadata for the container image;
writing data representative of the new version of the container image to the metadata; and
releasing the second selected lock type from the metadata.

23. The computer implemented method of claim 22, wherein the second selected lock type is an exclusive lock that prevents more than one entity from writing to the window while the exclusive lock is imposed on the window.

24. The computer implemented method of claim 22, wherein the second selected lock type is an exclusive lock that prevents more than one entity from writing to the metadata while the exclusive lock is imposed on the metadata.

25. The computer implemented method of claim 22, further comprising exposing a second window storing the metadata to a second container host;
imposing a shared lock on the second window that allows the second container host to read the data representative of the new version of the container image; and
releasing the shared lock from the second window.

* * * * *